United States Patent
Huang

(10) Patent No.: US 8,011,796 B2
(45) Date of Patent: Sep. 6, 2011

(54) LIGHT SOURCE SYSTEM AND DISPLAY APPARATUS COMPRISING THE LIGHT SOURCE SYSTEM

(75) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 214 days.

(21) Appl. No.: 12/043,265

(22) Filed: Mar. 6, 2008

(65) Prior Publication Data

US 2008/0310168 A1   Dec. 18, 2008

(30) Foreign Application Priority Data

Jun. 15, 2007   (TW) ............................ 96121738 A

(51) Int. Cl.
*F21V 13/08* (2006.01)
*F21S 10/00* (2006.01)

(52) U.S. Cl. ............. 362/145; 362/321; 359/18; 353/94

(58) Field of Classification Search .................. 362/145, 362/321; 359/18; 353/94
See application file for complete search history.

(56) References Cited

U.S. PATENT DOCUMENTS

| | | | | |
|---|---|---|---|---|
| 3,790,797 A * | 2/1974 | Sternberg et al. | ............. | 250/345 |
| 5,295,004 A * | 3/1994 | Hasegawa et al. | ............. | 359/17 |
| 6,018,409 A * | 1/2000 | Eum et al. | ................... | 359/204.1 |
| 6,046,831 A * | 4/2000 | Eum et al. | ......................... | 359/18 |
| 6,181,447 B1 * | 1/2001 | Eum et al. | ......................... | 359/18 |
| 7,322,703 B2 * | 1/2008 | Matsui | .............................. | 353/84 |
| 7,347,557 B2 * | 3/2008 | De Smet | .......................... | 353/20 |
| 7,452,087 B2 * | 11/2008 | Imade | ........................... | 353/102 |
| 7,628,495 B2 * | 12/2009 | Tangen | ............................ | 353/94 |
| 2002/0039210 A1 * | 4/2002 | Choi et al. | ........................ | 359/18 |
| 2005/0213051 A1 | 9/2005 | Smet | | |
| 2006/0023167 A1 * | 2/2006 | Chiang et al. | ................... | 353/31 |
| 2006/0023172 A1 * | 2/2006 | Ikeda et al. | ....................... | 353/94 |
| 2006/0274187 A1 | 12/2006 | Tangen | | |

FOREIGN PATENT DOCUMENTS

CN   1727988   2/2006
JP   200741567   2/2007

OTHER PUBLICATIONS

Murat et al.,"Increased lumens per etendue by combining pulsed light-emitting diodes", Optical Engineering, Mar. 2006, 8 pages, vol. 45(3).
Office Action from corresponding Taiwanese Application No. 096121738 dated Jul. 27, 2010.
Office Action from corresponding Taiwanese Application No. 096121738 dated Apr. 11, 2011. English machine translation attached.

* cited by examiner

*Primary Examiner* — Jong-Suk (James) Lee
*Assistant Examiner* — Peggy A. Neils
(74) *Attorney, Agent, or Firm* — Grossman, Tucker, Perreault & Pfleger, PLLC

(57) ABSTRACT

A light source system and a display apparatus comprising the light source system are provided. The display apparatus comprises the light source system and an imaging system. The light source system is configured to provide a light for imaging. The light source system comprises a mirror wheel and at least two light source modules, configured to provide at least two light beams respectively. These light beams are lit up according to a predetermined sequence. After being reflected by or directly passing through the mirror wheel, the light beams form a continuous light, traveling into the imaging system for imaging on a screen.

19 Claims, 9 Drawing Sheets

LIGHT SOURCE SYSTEM AND DISPLAY APPARATUS COMPRISING THE LIGHT SOURCE SYSTEM

This application claims priority to Taiwan Patent Application No. 096121738 filed on Jun. 15, 2007, the disclosures of which are incorporated herein by reference in their entirety.

BACKGROUND OF THE INVENTION

1. Field of the Invention

The present invention provides a light source system and a display apparatus comprising the same, and particularly, relates to a light emitting diode (LED) light source system with high luminance and a display apparatus comprising the same.

2. Descriptions of the Related Art

Currently, more projection display apparatuses are adopting light emitting diodes (LEDs) as the light source in an attempt to increase the color gamut and decrease the power consumption. Because its short startup time and long life, light source of LED is used to replace high-pressure-mercury lamps in conventional projection display apparatuses. However, as a kind of divergent light source, LED is restricted by the étendue conservation law that makes the light source effective only within a limited light source area and a limited angle. Consequently, the luminance of the projection display apparatus cannot be improved by simply adding more LED light sources. As a result, it is important to improve the luminance of a projection display apparatus adopting LEDs as the light source.

A light source module employing LEDs as the light source and a projection system comprising the light source module are disclosed in U.S. patent application Ser. No. 11/081,825. The light source module, a structure of which is depicted in FIG. 1A, drives the LEDs with discrete pulses and provides increased luminance by receiving a high current input. As shown in FIG. 1A, such a light source module 1 comprises a first LED 111, a second LED 112, a mirror wheel 12, and a power control device (not shown). The two LEDs 111, 112, with the mirror wheel 12 disposed therebetween, are disposed such that their light emitting paths are substantially orthogonal to each other.

As depicted in FIG. 1B, the mirror wheel 12 rotating about its axis 123 comprises a plurality of interleaved reflective segments 121 and transmitting segments 122. When the power control device supplies a current to the first LED 111 to emit light, one transmitting segment 122 of the mirror wheel 12 will be rotated synchronously to a position corresponding to a direction in which the first LED 111 emits light, so that the light can transmit therethrough and exit towards the output direction. On the other hand, when the power control device supplies a current to the second LED 112 instead and switches off the current input of the first LED 111, one reflective segment 121 of the mirror wheel 12 will be rotated to a position corresponding to a direction in which the second LED 112 emits light, so that the light from the second LED 112 is reflected and propagates in the same output direction. In this way, the two LEDs as a whole can provide the desired light beams in a fast alternating manner, resulting in an almost continuous light as perceived by the human eye.

FIG. 2 is a schematic graph depicting the alternating emission duty cycle of the aforesaid light emitting structure. More specifically, the alternating emission of the two LEDs will result in a higher luminance, as well as a light flux of an On-State (i.e., the "flat peak section" labeled by symbol A) in the output light, which is adapted to form a nearly continuous light flux along the time axis as a replacement for the continuous operation mode of a single LED.

However, in the practical operation of this structure, since the mirror wheel 12 consists of a plurality of reflective segments 121 and transmitting segments 122 interleaved with each other, a number of border regions will be inevitably formed therebetween. If a light beam from either of the LEDs impinges entirely or partially on such border regions, not only will light be lost, but also the instantaneous output light flux will be degraded.

To avoid the aforesaid light loss, the LEDs must be controlled to not emit light in the border regions as far as possible. However, since positions for two LEDs already have fixed, the only solution is to switch off the operating LED in advance when the border region of the mirror wheel 12 is nearly approaching a light beam of a LED, after which the opposite LED will be switched on immediately. In other words, the border regions should be accompanied with an Off-State (i.e., the "narrow trough section" labeled by symbol B) as fast as possible. The opposite LED will be allowed to emit light only when the border region passes by the LED.

However, as is well known, LEDs provide a highly divergent light beam, rather than a collecting light beam from an ellipsoidal lamp or a parallel light beam from a parabola lamp. As a result, the light beam projected on by an LED will actually occupy a substantial area on the mirror wheel 12, which makes it impractical to switch the LEDs on and off in advance to achieve a desired effect. In addition, when border regions are skipped, the borders regions on the mirror wheel 12 will create a substantial unusable area on the mirror wheel 12. This will not only undoubtedly shorten the desirable "flat peak sections" and lengthen the unwanted "narrow trough sections" in the otherwise continuous light flux, but also exacerbate the discontinuity in the light flux and degrade the usage efficiency of the mirror wheel 12 significantly. Furthermore, this structure relies entirely on a mirror wheel to integrate the light beams. Each additional mirror wheel may further increase the size of the projection display apparatus significantly. Therefore, in consideration of practical requirements on size of a projection display apparatus, luminance improvement this structure may provide is limited.

In summary, the LED light source structure used in the prior art projection display apparatuses has deficiencies, such as low light emission efficiency, limited room for the improvement of luminance and discontinuous light flux. In view of this, it is highly desirable to provide a light source system with higher luminance, continuous light flux and increased light emission efficiency.

SUMMARY OF THE INVENTION

One objective of this invention is to provide a light source system and a display apparatus comprising the same. This light source system may deliver improved luminance, increased light emission efficiency and sufficient light flux, while maintaining a continuous light output as perceived by the human eye.

To this end, a light source system of this invention comprises a mirror wheel and two light source modules. The mirror wheel includes a central rotating shaft and a body. The body is disposed at an outer edge of the central rotating shaft, and has an inner area and an outer area. The outer area is formed at an outer edge of the inner area, and comprises one reflective segment and one transmitting segment, both arranged along the outer edge of the inner area interleavedly and continuously. The two light source modules, each comprising a plurality of light emitting diodes (LEDs) and the light collecting element, are disposed at two opposite sides of the mirror wheel respectively. The light collecting element is adapted to converge the light beams projected from the LEDs to one of the reflective segments and the transmitting segment.

A display apparatus of this invention comprises the aforesaid light source system and an imaging system. The light source system is configured to provide light beams for imaging. The two light source modules included in the light source system are configured to provide two light beams respectively. These light beams are lighted up according to a predetermined integrated timing sequence to form a continuous light for transmission to the imaging system. The imaging is configured to image with the light provided from the light source system.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
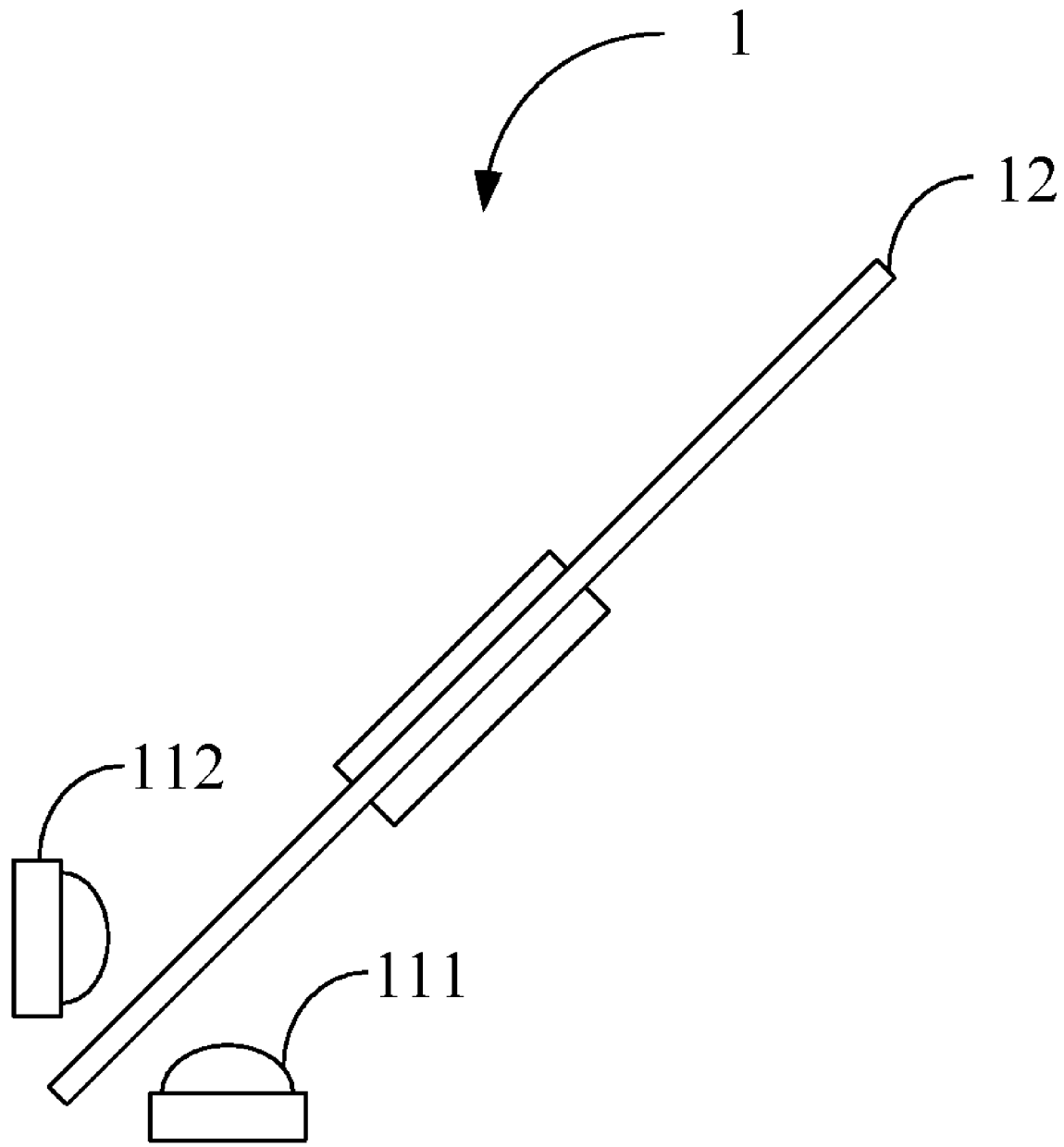
FIG. 1A illustrates the deployment relationship between a mirror wheel and light sources in the prior art.
Figure 1B:
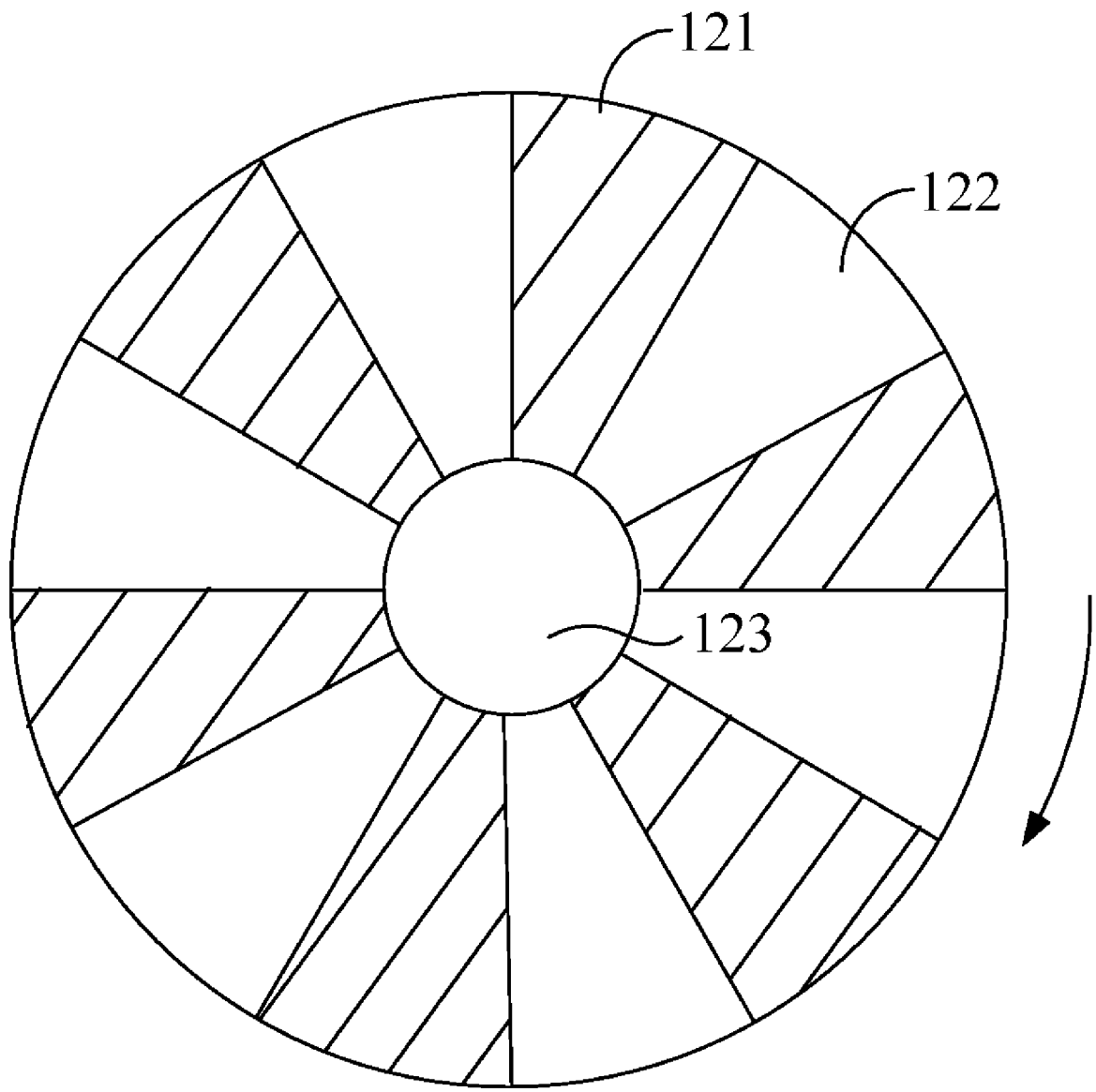
FIG. 1B illustrates the mirror wheel of FIG. 1A.
Figure 2:
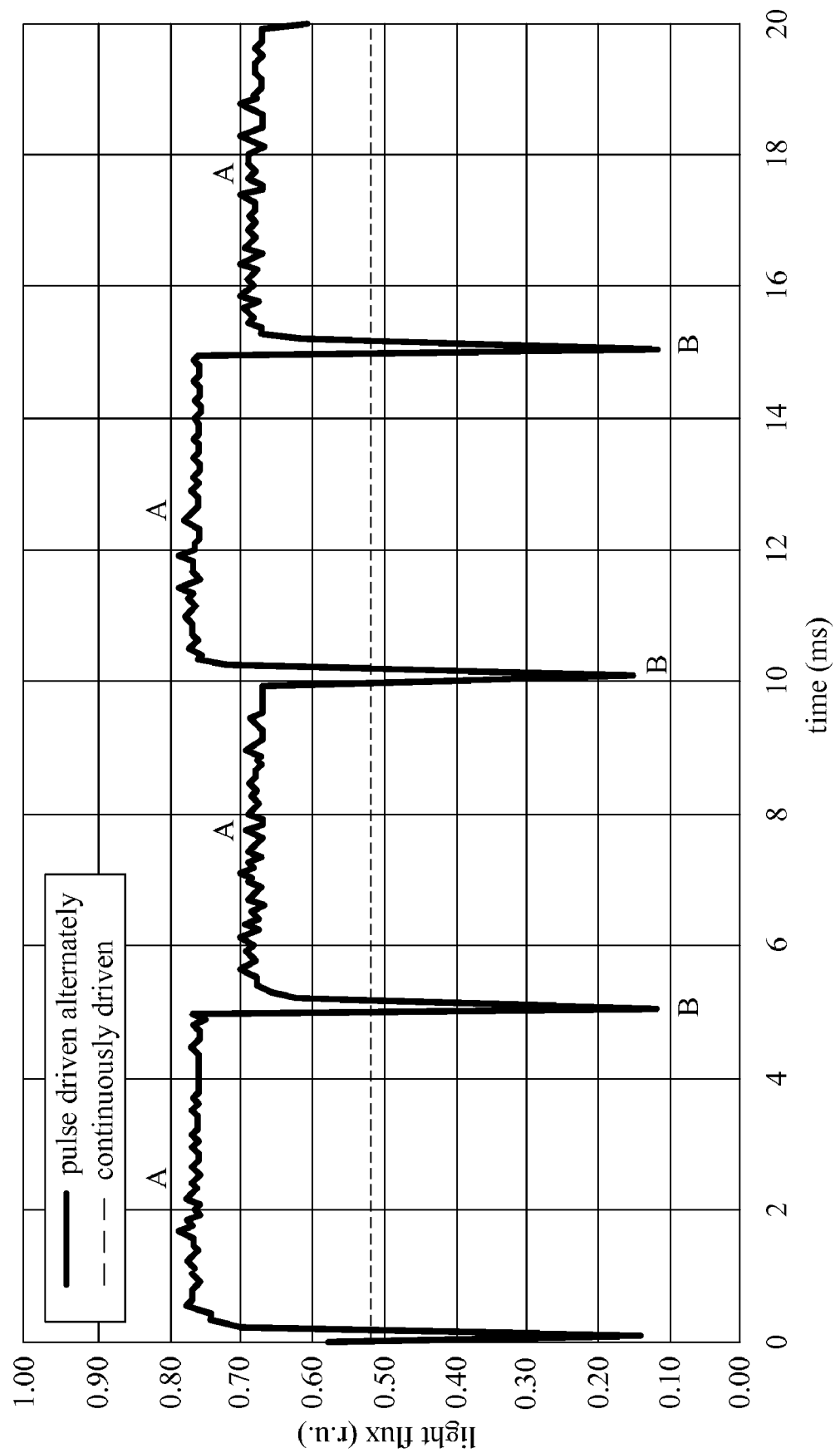
FIG. 2 is a graph showing the light flux versus time in the alternately light emitting structure shown in FIG. 1A.
Figure 3A:
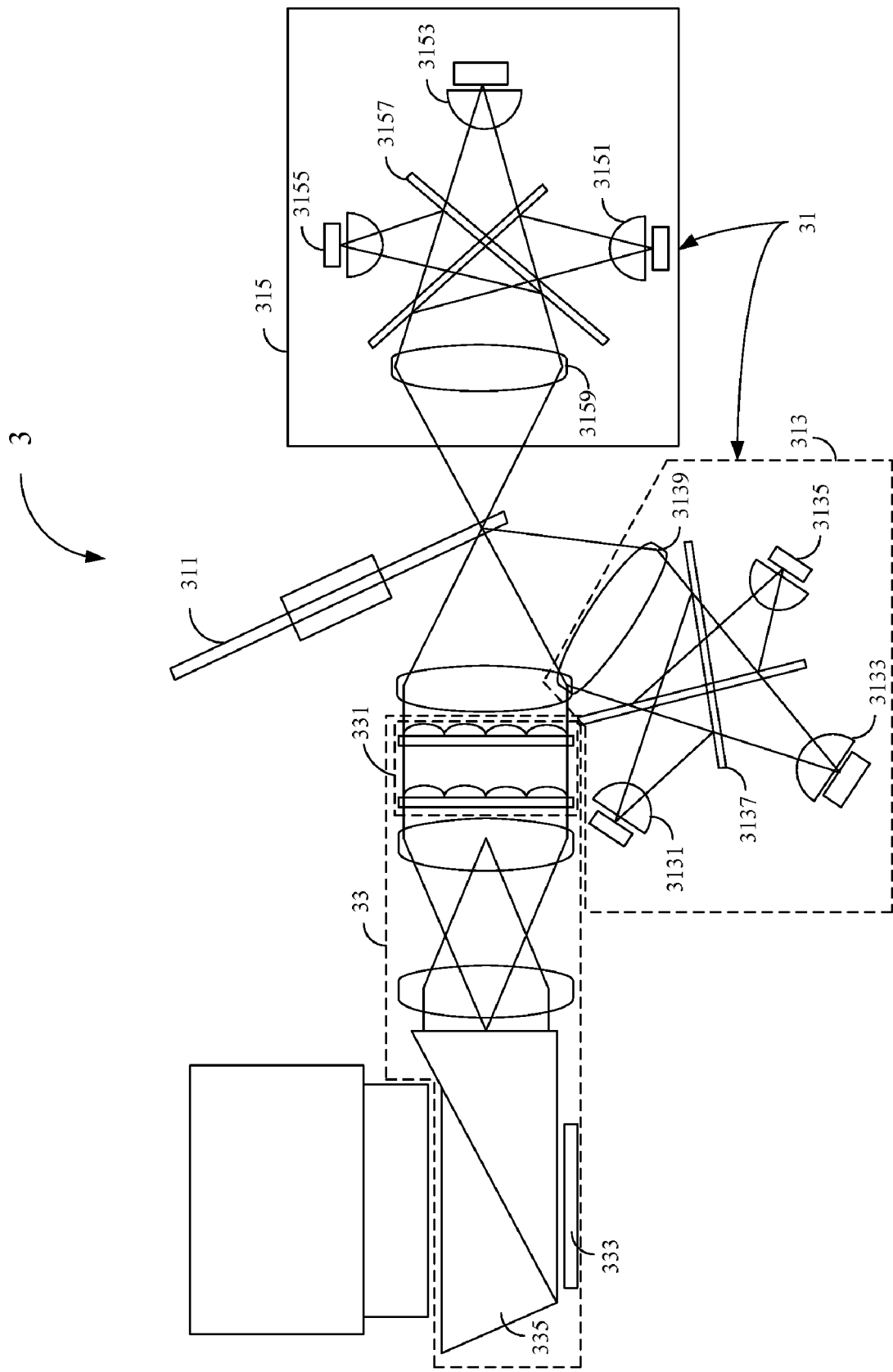
FIG. 3A illustrates the display apparatus in accordance with the first embodiment of this invention.

A display apparatus 3 in accordance with a first embodiment of this invention is depicted in FIG. 3A. The display apparatus 3, which in this embodiment is a projector, comprises a light source system 31 and an imaging system 33. The light source system 31, which is configured to provide a light beam for imaging, comprises a mirror wheel 311, a first light source module 313, a second light source module 315 and a controller (not shown).

Figure 5A:
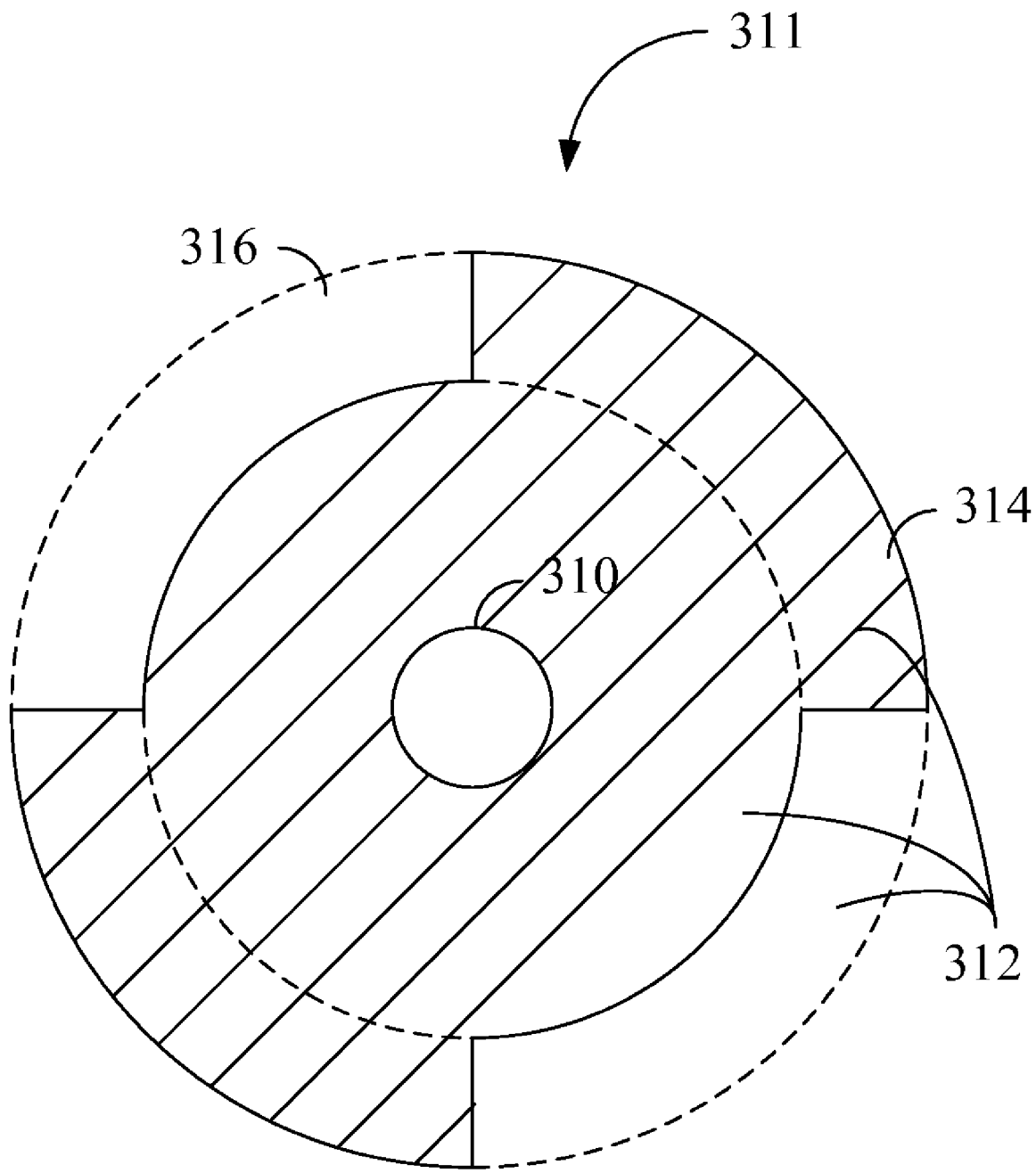
FIG. 5A illustrates the mirror wheel in the first embodiment of this invention.

As shown in FIG. 5A, the mirror wheel 311 has a central rotating shaft 310 and a body 312 which in this embodiment is shaped like a disc, for example, a disc of 5 cm in diameter (the diameter can be adjusted depending on the actual requirements). The body 312 is disposed at an outer edge of the central rotating shaft 310, and comprises an inner area and an outer area formed at an outer edge of the inner area. The outer area has a plurality of reflective segments 314 and a plurality of transmitting segments 316, with the reflective segments 314 and the transmitting segments 316 arranged along the outer edge of the inner area alternately and continuously. The reflective segments 314 are equally spaced apart with one another along the outer edge of the inner area to form a hollow segment that is adapted to define each of the transmitting segments 316. In this embodiment, there are two reflective segments 314 and two transparent segments 316 as shown in FIG. 5A. The reflective segments 314 and the transmitting segments 316 are arranged alternately for the purpose of switching between the first light source module 313 and the second light source module 315. Embodiments may also have one reflective segment 314 and transmitting segment 316 or more than one of them.

The first light source module 313 and the second light source module 315 are disposed symmetrically with respect to the mirror wheel 311. A controller (not shown) is electrically connected to the two light source modules to control the voltage levels of a first main timing sequence and a second main timing sequence inputted to the two light source modules respectively. The first light source module 313 includes a first LED 3131, a second LED 3133, a third LED 3135, a first light coupling element 3137 and a first light collecting element 3139. The first LED 3131, the second LED 3133 and the third LED 3135 are lit up to emit light according to the first main timing sequence. The first light coupling element 3137 is adapted to redirect light beams projected by the LEDs to the first light collecting element 3139. The first light collecting element 3139 is adapted to converge the light beam from the first coupling element 3137 to form a first light beam for projecting onto the reflective segments 314. The first LED 3131, the second LED 3133 and the third LED 3135 are green, red and blue respectively.

Figure 3B:
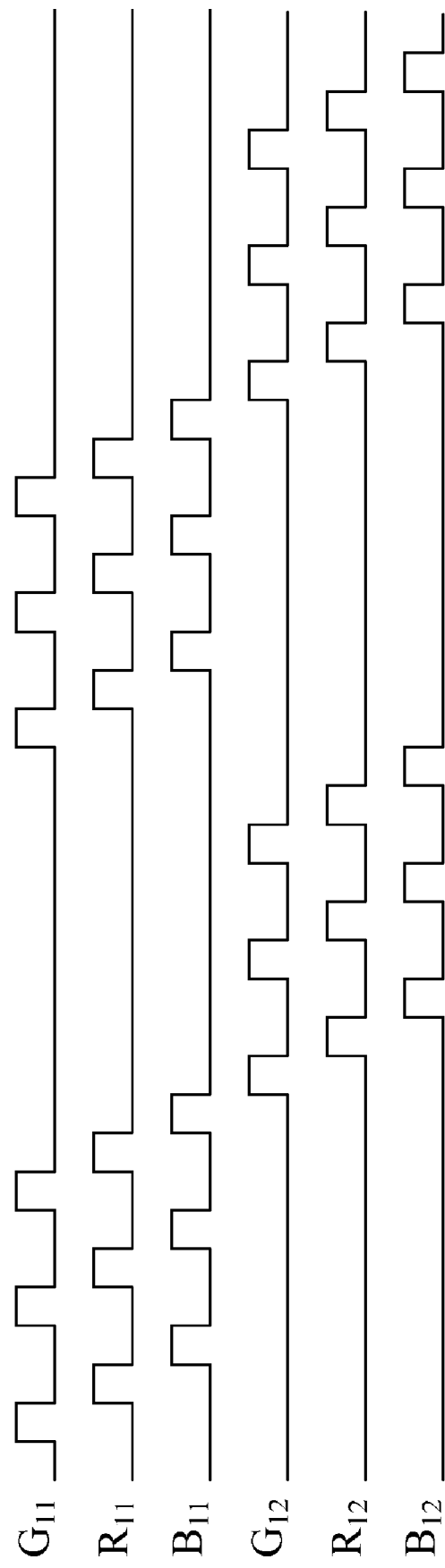
FIG. 3B is a timing diagram for the light emission of the structure of FIG. 3A.

As shown in the timing diagram of FIG. 3B, the first main timing sequence comprises three timing subsequences, i.e., a first timing sequence $G_{11}$, a second timing sequence $R_{11}$ and a third timing sequence $B_{11}$, according to which the first LED 3131, the second LED 3133 and the third LED 3135 project light beams to the first light collecting element 3139 successively. The main timing sequence and the timing subsequences are configured to provide input voltages in an interleaved pulse format.

The second light source module 315 includes a fourth LED 3151, a fifth LED 3153, a sixth LED 3155, a second light coupling element 3157 and a second light collecting element 3159. The fourth LED 3151, the fifth LED 3153 and the sixth LED 3155 are lit up to emit light according to the second main timing sequence. The second light coupling element 3157 is adapted to redirect light beams projected by each of these LEDs to the second light collecting element 3159. The second light collecting element 3159 is adapted to converge the light beam from the second coupling element 3157 to form a second light beam for projecting onto the transmitting segments 316. The fourth LED 3151, the fifth LED 3153 and the sixth LED 3155 are green, red and blue respectively. In this embodiment, the first light coupling element 3137 and/or the second light coupling element 3157 is an X-plate respectively. The first light collecting element 3139 and/or the second light collecting element 3159 comprises a lens respectively. It should be noted that the number of the LEDs, color and location of the light coupling elements, as well as the number, type and location of the light collecting elements are not just limited to those described above. For example, in other embodiments, the first light coupling element 3137 and/or the second light coupling element 3157 may also be a prism.

As shown in the timing diagram of FIG. 3B, the second main timing sequence comprises three timing subsequences, i.e., a fourth timing sequence $G_{12}$, a fifth timing sequence $R_{12}$ and a sixth timing sequence $B_{12}$, according to which the fourth LED 3151, the fifth LED 3153 and the sixth LED 3155 project light beams to the second light collecting element 3159 successively. These timing sequences are configured to provide input voltages in an interleaved pulse format.

It can be seen from the timing diagram of FIG. 3B that the first LED 3131, the second LED 3133 and the third LED 3135 of the first light source module 313, and the fourth LED 3151, the fifth LED 3153 and the sixth LED 3155 of the second light source module 315 are configured to emit light at different times. In other words, the controller is configured to light up the first light beam and the second light beam according to a preset integrated timing sequence depicted in the timing diagram. Specifically, in the first main timing sequence, there are three pulses for each of the three subsequences thereof. The total duration of the nine pulses included in a main timing sequence constitutes a so-called duty cycle. Driven by the nine pulses, the LEDs of the first light source module 313 are lit up successively for projecting a light beam onto the reflective segments 314 of the mirror wheel 311. Similarly, in the second main timing sequence, there are three pulses for each of the three subsequences thereof, and the LEDs are driven by the nine pulses. The LEDs of the second light source module 315 are lit up successively for projecting a light beam onto the transmitting segments 316 of the mirror wheel 311. Here, the LEDs of these light source modules have an extremely high switching speed, which depends on the number of transmitting segments 316 and reflective segments 314 as well as the rotation speed of the mirror wheel 313.

The first light source module 313 and the second light source module 315 operate alternately in respective duty cycles to produce the first and the second light beams which, as a whole, appear as a continuous light beam to the human eye. Then, the first and the second light beams propagate into the imaging system 33 through the reflective segments 314 and the transmitting segments 316 of the mirror wheel 311 respectively.

In this embodiment, the imaging system 33 comprises a lens array assembly 331, a digital micromirror device (DMD) 333 and a prism 335. Hence, after the light beams projected via the first light collecting element 3139 and the second light collecting element 3159 to the mirror wheel 311 are reflected from/transmitted through the mirror wheel 311, the resulting continuous light beams are processed by the lens array assembly 331 into light beams of uniform luminance and then reflected from the prism 335 to the DMD 333 for imaging. Finally, an image is projected via the prism 335 onto a screen (not shown).

In this embodiment, the two light source modules operate alternately to emit light beams so a duty cycle of either the light source modules is equal to a time period in which the mirror wheel 311 accomplish a quarter of the rotation. This time period in turn corresponds to the time periods when the first and the second light beams impinge on the reflective segments 314 and the transmitting segments 316 respectively. As individual LEDs are lighted up discretely according to a specific timing sequence in each duty cycle, the LEDs are able to withstand a higher current, thus giving rise to an increased overall luminance of the display apparatus 3.

Figure 4A:
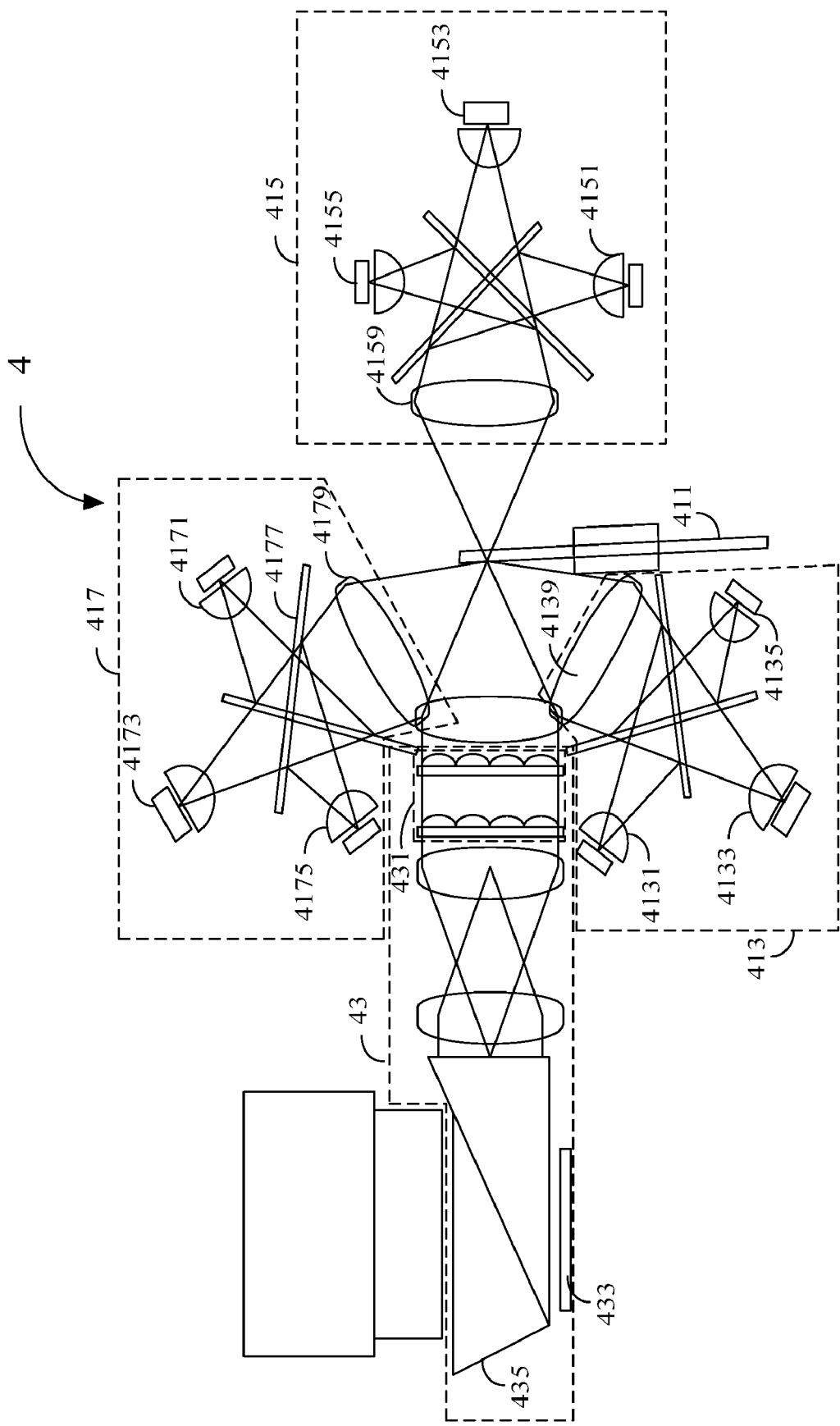
FIG. 4A illustrates a display apparatus in accordance with the second embodiment of this invention.
Figure 5B:
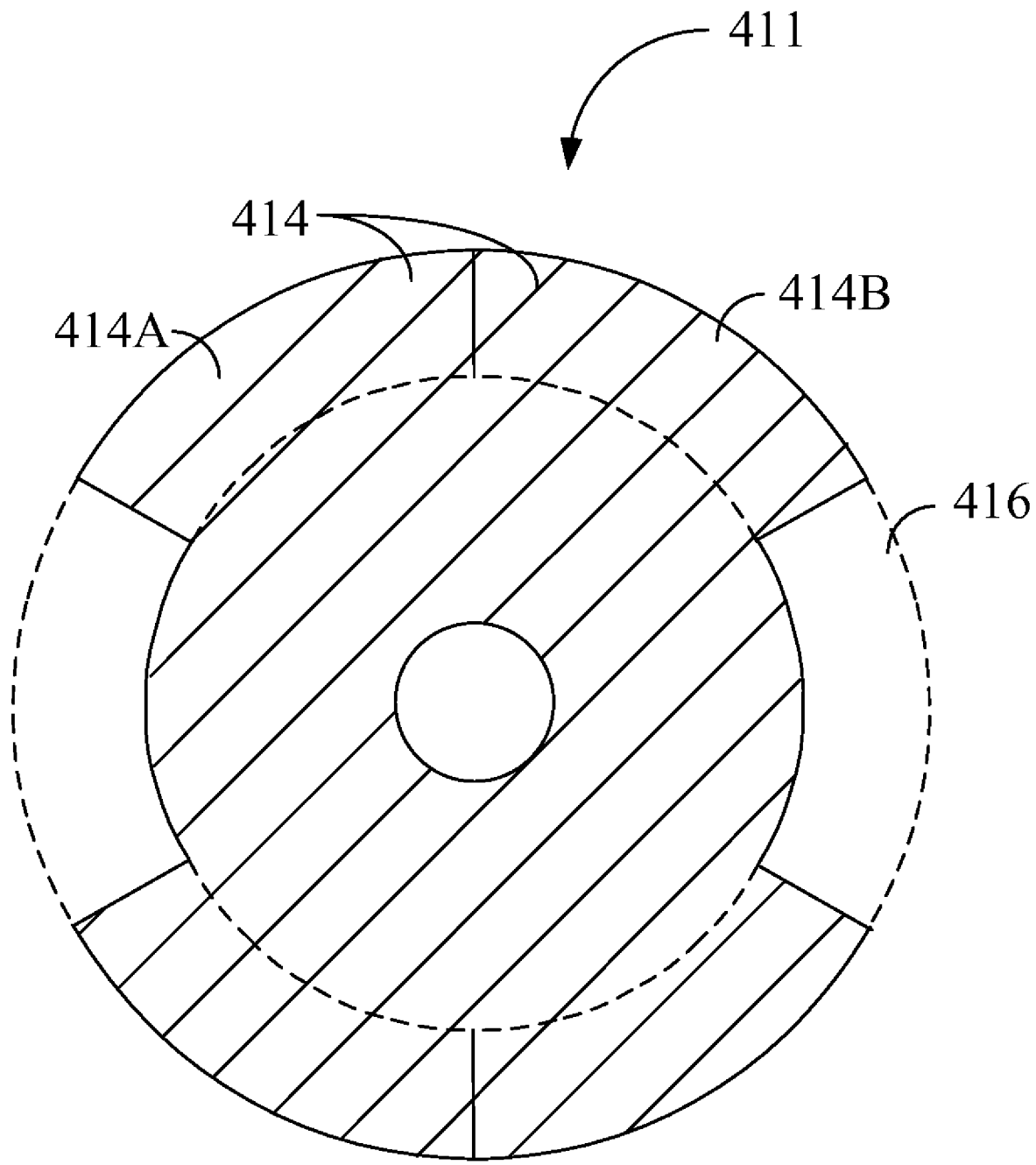
FIG. 5B illustrates the mirror wheel in the second embodiment of this invention.

A second embodiment of this invention, which is also a display apparatus 4, is depicted in FIG. 4A. Similarly, the display apparatus 4 comprises a light source system and an imaging system 43. In this embodiment, the display apparatus 4 is a projector. However, unlike the first embodiment, the light source system of this embodiment comprises three light source modules, i.e., a first light source module 413, a second light source module 415 and a third light source module 417 respectively. Additionally, in consideration of the additional third light source module 417, although a mirror wheel 411 in this embodiment still comprises two reflective segments 414 and two transmitting segments 416, both the reflective segments 414 thereof are further divided into a first reflective segment 414A and a second reflective segment 414B respectively, as shown in FIG. 5B. Here, the first reflective segment 414A, the second reflective segment 414B and the transmitting segment 416 are arranged alternately for switching between the first light source module 413, the third light source module 417 and the second light source module 415. It should be noted herein that to adapt to different incident directions of the first light beam from the first light source module 413 and the third light beam from the third light source module 417, the mirror wheel 411 should have different reflection angles (not shown) in the cross-sections of the first reflective segment 414A and the second reflective segment 414B so that these light beams are reflected in the same direction.

In the light source system of this embodiment, the first light source module 413 and the second light source 415 are just the same as the first light source module 313 and the second light source module 315 of the first embodiment, and hence will not be described in detail again. The three light source modules are disposed with respect to the mirror wheel 411 in such a way that light beams projected by these light source modules will impinge exactly on the first reflective segment 414A, the transmitting segment 416 and the second reflective segment 414B respectively.

The third light source module 417 includes a seventh LED 4171, an eighth LED 4173, a ninth LED 4175, a third light coupling element 4177 and a third light collecting element 4179. The seventh LED 4171, the eighth LED 4173 and the ninth LED 4175 are lit up to emit a plurality of light beams according to a third main timing sequence. The third light coupling element 4177 is adapted to redirect light beams projected by each of these LEDs to the third light collecting element 4179. The third light collecting element 4179 is adapted to converge the light beam from the third coupling element 4177 to form a third light beam for projecting onto the second reflective segments 414B. The seventh LED 4171, the eighth LED 4173 and the ninth LED 4175 are green, red and blue respectively. In this embodiment, the third light coupling element 4177 is an X-plate, while the third light collecting element 4179 comprises a lens. It should be noted that the number of LEDs, color and location of the light coupling elements, as well as the number, type and location of the light collecting elements are not just limited to what described above. For example, in other embodiments, the third light coupling element 4177 may also be a prism.

Figure 4B:
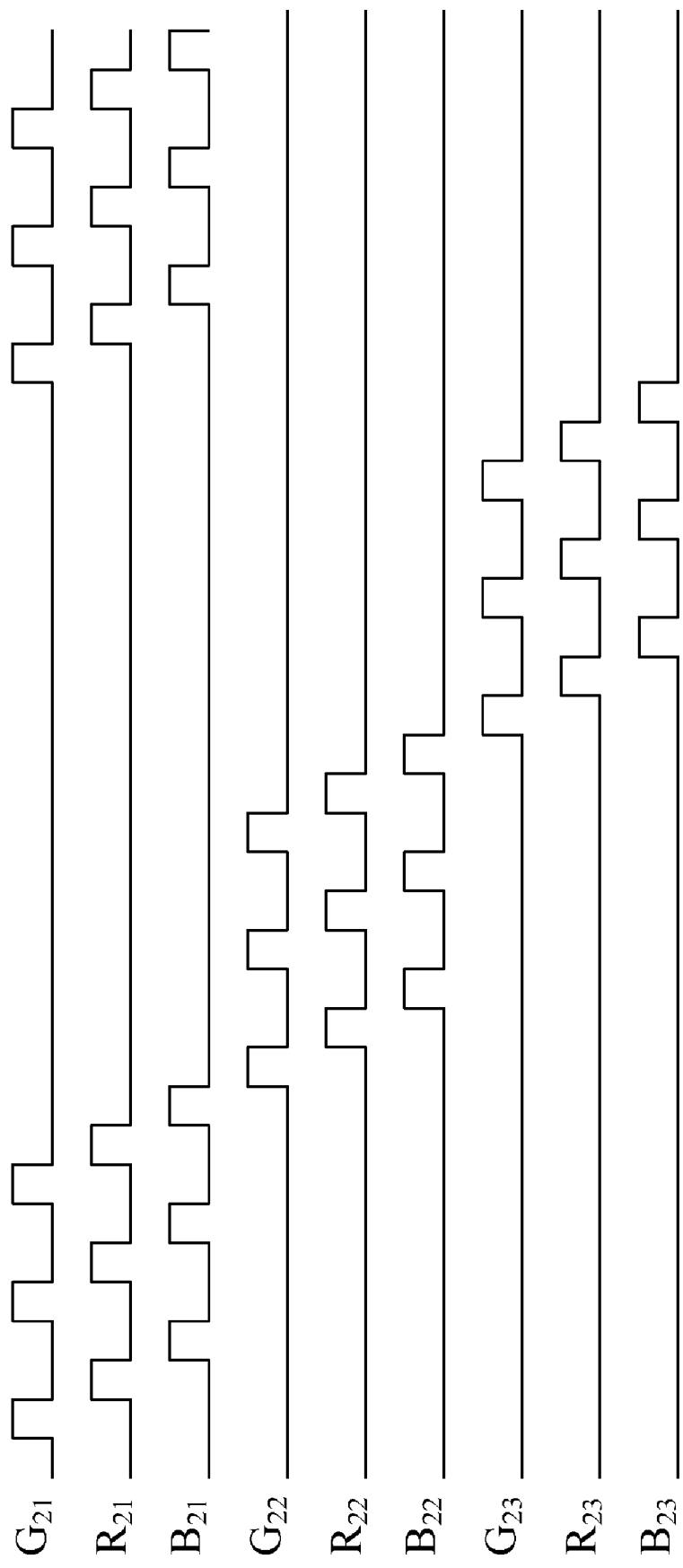
FIG. 4B is a timing diagram for the light emission of the structure of FIG. 4A.

As shown in the timing diagram of FIG. 4B, the third main timing sequence comprises three timing subsequences, i.e., a seventh timing sequence $G_{23}$, an eighth timing sequence $R_{23}$ and a ninth timing sequence $B_{23}$, according to which the seventh LED 4171, the eighth LED 4173 and the ninth LED 4175 project light beams to the third light collecting element 4179 successively. These timing sequences are configured to provide input voltages in an interleaved pulse format.

The first light source module 413 and the second light source module 415 of this embodiment are the same in structure as those of the previous embodiment. However, the first timing sequence $G_{21}$, the second timing sequence $R_{21}$ and the third timing sequence $B_{21}$ followed respectively by the first LED 4131, the second LED 4133 and the third LED 4135 of the first light source module 413, as well as the fourth timing sequence $G_{22}$, the fifth timing sequence $R_{22}$ and the sixth timing sequence $B_{22}$ followed respectively by the fourth LED 4151, the fifth LED 4153 and the sixth LED 4155 of the second light source module 415 are different from the first timing sequences $G_{11}$, the second timing sequence $R_{11}$, the third timing sequence $B_{11}$, the fourth timing sequence $G_{12}$, the fifth timing sequence $R_{12}$ and the sixth timing sequence $B_{12}$ of the previous embodiment.

Furthermore, it can be seen from the timing diagram of FIG. 4B that the first LED 4131, the second LED 4133 and the third LED 4135 of the first light source module 413, the fourth LED 4151, the fifth LED 4153 and the sixth LED 4155 of the second light source module 415, and the seventh LED 4171, the eighth LED 4173 and the ninth LED 4175 of the third light source module 417 are configured to emit light at different times. In other words, a controller is configured to light up the first, the second and the third light beams according to the preset integrated timing sequence depicted in the timing diagram. Specifically, in the first main timing sequence, there are three pulses for each of the three subsequences thereof. The total duration of the nine pulses included in a main timing sequence constitutes a so-called duty cycle. Driven by the nine pulses, the LEDs of the first light source module 413 are lit up successively for projecting a first continuous light beam onto the first reflective segments 414A of the mirror wheel 411. In the second main timing sequence, there are three pulses for each of the three subsequences thereof, thus constituting another duty cycle. Driven by the nine pulses, the LEDs of the second light source module 415 are lit up successively for projecting a second continuous light beam onto the transmitting segments 416 of the mirror wheel 411. Similarly, driven by the third main timing sequence, the LEDs of the third light source module 417 are lit up successively for projecting a third continuous light beam onto the second reflective segments 414B of the mirror wheel 411. Here, the LEDs described above have an extremely high switching speed, which depends on the number of transmitting segments 416 and reflective segments 414 as well as the rotation speed of the mirror wheel 411.

Briefly speaking, the first light source module 413, the second light source module 415 and the third light source module 417 are configured to operate one-by-one repeatedly. The first, the second and the third light beams emitted by these light source modules are projected onto the first reflective segment 414A, the transmitting segment 416 and the second reflective segment 414B respectively in such a way that the light paths they follow when propagating to the imaging system 43 overlap with each other.

In this embodiment, the imaging system 43 comprises a lens array assembly 431, a digital micromirror device (DMD) 433 and a prism 435. Hence, after the light beams projected via the first light collecting element 4139, the second light collecting element 4159 and the third light collecting element 4179 to the mirror wheel 411 are reflected from/transmitted through the mirror wheel 411, the resulting continuous light beams are processed by the lens array assembly 431 into light beams of uniform luminance and then reflected from the prism 435 to the DMD 433 for imaging. Finally, an image is projected via the prism 435 onto a screen (not shown).

In this embodiment, there are three light source modules operating alternately to produce light beams, so each individual light source module operates with a shorter duty cycle compared to those of the first embodiment. As a result, it is possible to drive each individual LED of the light source modules with a higher current, thus giving rise to an increased overall luminance of the display apparatus 4.

In conclusion, according to this invention, the LEDs are lit up discretely and alternately according to a specific timing sequence, so each individual LED is able to withstand a higher current, thereby giving rise to improved luminance. Furthermore, each additional light source module may contribute to further improved light emission efficiency and luminance. Moreover, with the configuration of the reflective segments and transmitting segments in combination with two or more interleaved timing sequences used for light source modules, light will not be lost during the switching of the light sources. In addition, of the instantaneous output light flux will also not be degraded. Therefore, the display apparatus of this invention is capable of displaying an image with optimal light emission efficiency, higher luminance and more uniform light flux.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A light source system, comprising:
a mirror wheel, including:
    a central rotating shaft;
    a body, configured at an outer edge of the central rotating shaft, the body having an inner area and an outer area, which is formed at an outer edge of the inner area, wherein the outer area comprises at least one reflective segment and at least one transmitting segment, both being arranged along the outer edge of the inner area interleavedly and continuously; and
    a first light source module and a second light source module, disposed at two opposite sides of the body of the minor wheel, respectively, the first light source module comprising a first light emitting diode (LED), a second LED, a third LED and a first light collecting element, and the second light source module comprising a fourth LED, a fifth LED, a sixth LED and a second light collecting element, wherein the LEDs of the first light source module project a plurality of light beams according to a first main timing sequence which comprises a first timing sequence, a second timing sequence, and a third timing sequence, the LEDs of the second light source module project a plurality of light beams according to a second main timing sequence which comprises a fourth timing sequence, a fifth timing sequence, and a sixth timing sequence, the first light collecting element converges the light beams projected from the LEDs of the first light source module to the reflective segment, the second light collecting element converges the light beams projected from the LEDs of the second light source module to the at least one transmitting segment, and the first main timing sequence and the second main timing sequence are configured to provide input voltages in an interleaved pulse format.

2. The light source system of claim 1, wherein the body is in a disc type.

3. The light source system of claim 1, wherein the outer area comprises a plurality of reflective segments and a plurality of transmitting segments, and the reflective segments and transmitting segments are interleavedly disposed along the outer edge of the inner area.

4. The light source system of claim 3, wherein the reflective segments are equally spaced apart from one another along the outer edge of the inner area, so as to form a hollow segment between each two adjacent reflective segments, and the hollow segments defines the transmitting segments.

5. The light source system of claim 3, wherein each of the light source modules projects the convergent light beams to one segment of the reflective segments and the transmitting segments.

6. The light source system of claim 3, wherein the first light collecting element converges the light beams of the first light source module to be projected to the reflective segments, and the second light collecting element converges the light beams of the second light source module to be projected to the transmitting segments.

7. The light source system of claim 6, further comprising a controller, electrically connected to the light source modules, for controlling the input voltages of the first main timing sequence and the second main timing sequence.

8. The light source system of claim 6, wherein the first LED, the second LED, and the third LED are a green LED, a red LED, and a blue LED, respectively.

9. The light source system of claim 6, wherein the fourth LED, the fifth LED, and the sixth LED are a green LED, a red LED, and a blue LED, respectively.

10. The light source system of claim 6, wherein the at least two light source modules further comprises:
a third light source module including a seventh LED, an eighth LED, a ninth LED, and a third light collecting element, wherein the LEDs of the third light source module project a plurality of light beams according to a third main timing sequence, and the third light collecting element converges the light beams to be projected to the reflective segments,
wherein the third main timing sequence is configured to provide input voltages in an interleaved pulse format.

11. The light source system of claim 10, wherein the reflective segments comprise a first reflective segment and a second reflective segment, and the first reflective segment and the second segment have a first reflective angle and a second reflective angle, which are different for reflecting the light beams projected from the first light source module and the third light source module to an identical light emitting direction.

12. The light source system of claim 10, further comprising a controller, electrically connected to the third light source module, for controlling the input voltages of the third main timing sequence.

13. The light source system of claim 10, wherein the third main timing sequence comprises a seventh timing sequence, an eighth timing sequence, and a ninth timing sequence, and wherein the seventh LED, the eighth LED, the ninth LED project the light beams to the third light collecting element according to the seventh timing sequence, the eighth timing sequence, and the ninth timing sequence, respectively, and the timing sequences are configured to provide input voltages in an interleaved pulse format.

14. The light source system of claim 10, wherein the seventh LED, the eighth LED, and the ninth LED are a green LED, a red LED, and a blue LED, respectively.

15. The light source system of any one of claims 1, wherein the light collecting element comprises a lens.

16. The light source system of claim 1, wherein each of the light source modules further comprises a light coupling element for changing directions of the light beams projected from the LEDs to the light collecting element and being converged.

17. The light source system of claim 16, wherein the light coupling element is an X-plate.

18. The light source system of claim 16, wherein the light coupling element is a prism.

19. A display apparatus, comprising:
a light source system of claim 1 for providing light beams for imaging; and
an imaging system for imaging the light beams provided form the light source system, wherein the first light source module and the second light source module are configured to provide at least two light beams, respectively, and the light beams are lighted up according to a predetermined integrated timing sequence to form a continuous light to be transmitted to the imaging system.

* * * * *